United States Patent
Marion

(10) Patent No.: US 7,379,232 B2
(45) Date of Patent: May 27, 2008

(54) FIBER OPTIC LINK GAIN CONTROL

(75) Inventor: Robert C. Marion, Pelham, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 0 days.

(21) Appl. No.: 11/439,213

(22) Filed: May 24, 2006

(65) Prior Publication Data

US 2007/0273963 A1  Nov. 29, 2007

(51) Int. Cl.
*H01S 3/00* (2006.01)
*H01Q 15/00* (2006.01)

(52) U.S. Cl. .......................... 359/333; 398/115; 342/9

(58) Field of Classification Search ................ 359/333; 398/94, 115, 162; 342/9
See application file for complete search history.

(56) References Cited

U.S. PATENT DOCUMENTS

| | | | | |
|---|---|---|---|---|
| 4,808,999 A * | 2/1989 | Toman | ......................... | 342/15 |
| 5,136,295 A * | 8/1992 | Bull et al. | ..................... | 342/15 |
| 5,260,820 A * | 11/1993 | Bull et al. | ................... | 398/125 |
| 6,542,109 B2 * | 4/2003 | Lloyd et al. | ................... | 342/14 |
| 6,804,495 B2 * | 10/2004 | Duthie | ..................... | 455/67.11 |
| 7,020,092 B1 * | 3/2006 | Weiske et al. | .............. | 370/252 |
| 7,142,148 B2 * | 11/2006 | Eneroth | ........................ | 342/14 |

* cited by examiner

*Primary Examiner*—Mark Hellner
(74) *Attorney, Agent, or Firm*—Bingham McCutchen LLP; Robert C. Bertin

(57) ABSTRACT

An optical attenuator is included within an aircraft decoy driver system for driving a fiber optic towed decoy system to compensate for variability in the fiber optic connection to the towed decoy system. The attenuator is controlled by a control signal from the towed decoy system and adjusts the link gain based on this feedback control signal to compensate for link loss, which is highly variable and may include losses as a function of cable, connectors and splices, and to maintain a relatively constant gain. To ensure the broadest range of performance, a higher power laser can be used to drive an external Mach Zhender Modulator or an erbium doped fiber amplifier (EDFA) prior to the optical attenuator. The result is a fiber optic towed decoy system that is adaptable to various platforms and design configurations without degradation in performance of the towed decoy system.

15 Claims, 6 Drawing Sheets

FIBER OPTIC LINK GAIN CONTROL

FIELD OF THE INVENTION

The present invention relates generally to the use of optical amplifiers and attenuators in fiber optic communication links and, in particular, to the use of an optical amplifier and a variable attenuator in fiber optic links for gain control where the operating environment of the link is variable.

BACKGROUND OF THE INVENTION

The use of optical fibers in communication links has grown because of the high data rates achievable using optical communications. In addition, fiber optic links are less susceptible to electromagnetic interference and thus are used in military and other applications where the possibility of high levels of electromagnetic interference exists.

In general in optical fiber communications, fibers are designed to connect a transmission system and a receiving system with a minimum of optical losses. For long haul communication systems, the optical fiber communications link itself may include amplifiers at periodic distances for amplifying attenuated optical signals for the next leg of the long distance link. For relatively short optical fiber links, attenuation is generally less problematic. For certain short distance optical fiber applications, however, optical attenuation and predictable optical signals levels remain problematic.

Certain military applications, for example, utilize fiber optics to convey optical signals from a location that has good electromagnetic shielding to another location that does not have good electromagnetic shielding. As such, the optical fibers convey signals as light through a harsh environment, thus protecting the signals from electromagnetic interference. Such applications include optical fiber towed decoy applications. In these applications, decoys may be connected both physically and optically to an aircraft and one or more decoys may be towed behind the aircraft and deployed as a countermeasure to help the aircraft evade hostile, incoming guided missiles.

There are several problems associated with optical fiber towed decoys that are driven by the optical link performance. First, the optical loss between the transmitter and the optical receiver of the decoy is variable based on the number of connectors and the loss of each connector. Since the impact on the RF performance is 2:1 with respect to the optical connector and fiber losses, these losses are significant. Second, the optical loss can change as a function of time or the operating environment. In particular, fiber optic blind mate connectors that are exposed to the external environment can suffer degradation due to multiple mating cycles and a harsh environment in terms of cleanliness. With the current optical link design, there is not a way to compensate for the additional loss and system level RF performance may be negatively impacted. The current approach to addressing the optical loss variation is to maintain higher than desirable gain in the decoy. This high gain can be problematic because high gain in a small package can impact stability. Third, the current approach does not address compatibility between different platforms where the optical loss may be different. The current approach is based on a worst case loss allocation and the towed decoy gain requirements are higher than desirable to ensure system performance requirements are met. However, application of this system to other platforms is limited due to the worst case assumptions used.

There is a need, therefore, for a system and method of configuring a fiber optic system on an aircraft and on a towed decoy that are compatible across a wide range of optical attenuation in the optical fiber link. There is a further need for a method of producing an optical signal for driving a fiber optic towed decoy that is more robust, consistent and economical and to produce a signal level to the towed decoy that may be increased and adapted as conditions change. There is still a further need for a system and method that reduce or eliminate the impact of the platform optical loss on system performance while making the towed decoy more stable.

SUMMARY OF THE INVENTION

According to an embodiment of the present invention, an optical attenuator is included within a fiber optic transmission system for driving a fiber optic towed decoy system. The attenuator is used to adjust the optical signal level transmitted to the decoy to maintain relatively constant performance over a wide range of optical loss variation. The attenuator is controlled based on optical power information from the towed decoy that indicates if the power is out of tolerance. To further increase usable range of the gain control system, an Erbium Doped Fiber Amplifier (EDFA) may be used to provide additional power and optical power range. The EDFA may be run in saturation mode to provide constant output power, with the drive power to the decoy being set by the attenuator. The result is a fiber optic link that improves towed decoy system performance over a range of platforms with less decoy gain requirements.

According to one embodiment of the invention, the towed decoy optical link includes a laser transmitter that has a CW laser, a modulator, an optical attenuator, output optical switching and some control circuitry. An optical receiver is located in the towed decoy, as a photodiode. Feedback from the decoy to the laser transmitter is used to control the optical attenuator. The feedback information provides a measure of the optical power in the decoy by measuring the optical receiver photocurrent. The attenuator setting is then controlled or adjusted up or down based on the photocurrent. The optical link and therefore towed decoy system performance is improved by operating the link within a tighter range of optical power than previously achievable by controlling the photocurrent.

The towed decoy itself may include an optical receiver to receive the optical signal and convert the optical signal to a radio frequency signal that is capable of being amplified and broadcast to disrupt an incoming guided missile. The towed decoy may further include a solid state amplifier that amplifies the radio frequency signal and at least one traveling wave tube coupled to the output of the solid state amplifier that further amplifies the radio frequency signal.

BRIEF DESCRIPTION OF THE FIGURES

The above described features and advantages of the present invention are more fully described with reference to the detailed description and Figures, in which.

DETAILED DESCRIPTION

According to an embodiment of the present invention, an optical attenuator is included within a fiber optic transmission system for driving a fiber optic towed decoy system. The attenuator receives a control signal from the towed decoy system and adjusts the link gain based on this feedback signal to compensate for link loss within the driving system and link loss associated between a blind connection between the driving system and the towed decoy. In order to ensure the broadest range of compatability with aircraft platforms, an erbium doped fiber amplifier (EDFA) run in a saturation mode may be introduced to boost the amplitude of the optical signal prior to the variable optical attenuator. The result is a towed decoy system capable of operating more consistently across a range of platforms and in some cases less stringent gain requirements on towed decoy components.

Figure 1:
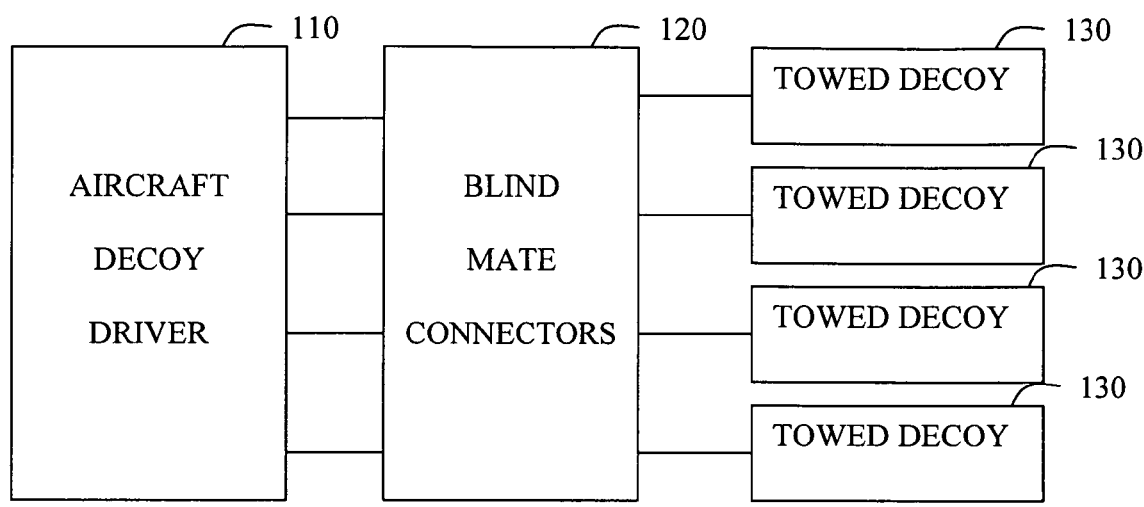
FIG. 1 depicts a towed decoy communications system.

FIG. 1 depicts the basic elements of a towed decoy system 100. Referring to FIG. 1, the system includes an aircraft decoy driver system 110 within an aircraft body, blind mate connectors 120 and one or more towed decoy systems 130. In general, the system is designed to deploy one active decoy system at a time. The blind mate connector is coupled using fiber optic lines between the aircraft decoy driver 110 and each towed decoy 130.

The aircraft decoy driver system 110 converts a radio frequency RF signal input into an optical signal that is conveyed to a towed decoy system for the purpose of producing decoy signals designed to confuse an incoming guided missile. The blind mate connector is an optical connector that is used to connect fiber optic cables for each towed decoy to the aircraft decoy driver system. The blind mate connector is in frequent use for connecting and disconnecting towed decoys to aircraft. Thus, the points of connection within the connector become dirty and less effective over time and use, with the result being increased attenuation of optical signals passing through the connector. Other connectors on the aircraft between the blind mate connector and the aircraft decoy driver system also contribute attenuation to optical signals transmitted between the decoy driver system and the towed decoy system. Each of these connectors may introduce attenuation on the order of 0.2 dB to 0.75 dB. The impact of each source of optical attenuation has twice the impact attenuation on the RF signal due to the modulation transfer function.

A single aircraft may have multiple blind mate connectors for connecting multiple towed decoys. During operation, only one towed decoy is generally active at a time. The towed decoy receives the optical signal from a fiber optic line coupled to the blind mate connector and converts the signal to RF energy and in turn broadcasts the RF signal to confuse incoming guided missiles. A characteristic of such towed decoy systems is that they have high gain. Because of this, the level of the optical signal entering the towed decoy is part of the overall amplification within the system. Accordingly, when the attenuation of the optical signal, through connectors on the aircraft and the blind mate connector is high, the towed decoy many not operate properly. Moreover, because towed decoys are designed to be deployed on several different aircraft, the level of the optical signal is somewhat unpredictable and varies from aircraft to aircraft. This can lead to unpredictable performance results and unwanted oscillation within the towed decoy RF system.

Figure 2A:
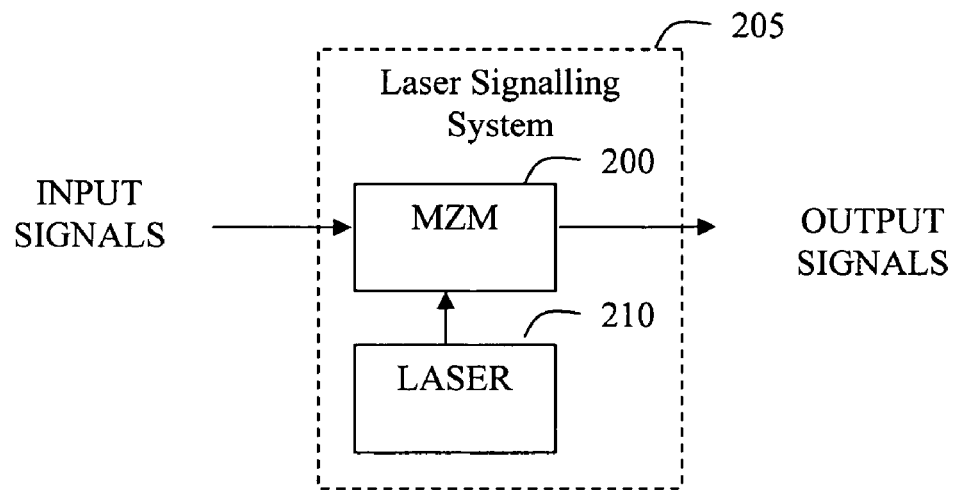
FIGS. 2A and 2B depicts a laser signaling system associated with an aircraft decoy driver/control system according to an embodiment of the present invention.
Figure 2B:
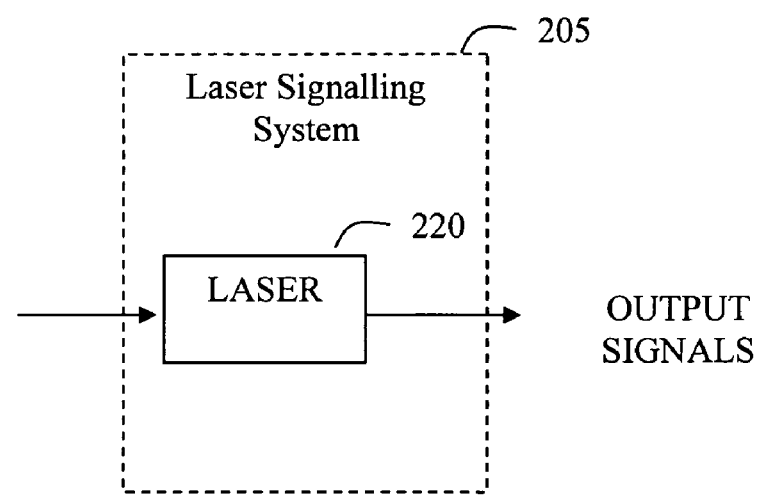

FIG. 2A depicts a laser signaling system that may be incorporated into an aircraft driver/control system according to embodiments of the present invention. Referring to FIG. 2A, the laser signaling system 205 may include a laser 200 and a Mach Zehnder Modulator (MZM) 210. The laser 200 may be any convenient laser. According to one embodiment of the invention, the laser produces light at a wavelength of 1550 nm. The MZM receives the laser input and a RF signal input and pursuant to the well known MZM modulation process modulates the light with the RF signal. The MZM may be any convenient MZM, including those commercially supplied by JDS Uniphase. Alternatively, the laser signaling system may be implemented as shown in FIG. 2B, where a laser 220 (alone or with additional components) generates an output signal from an input signal and direct modulation.

Figure 3:
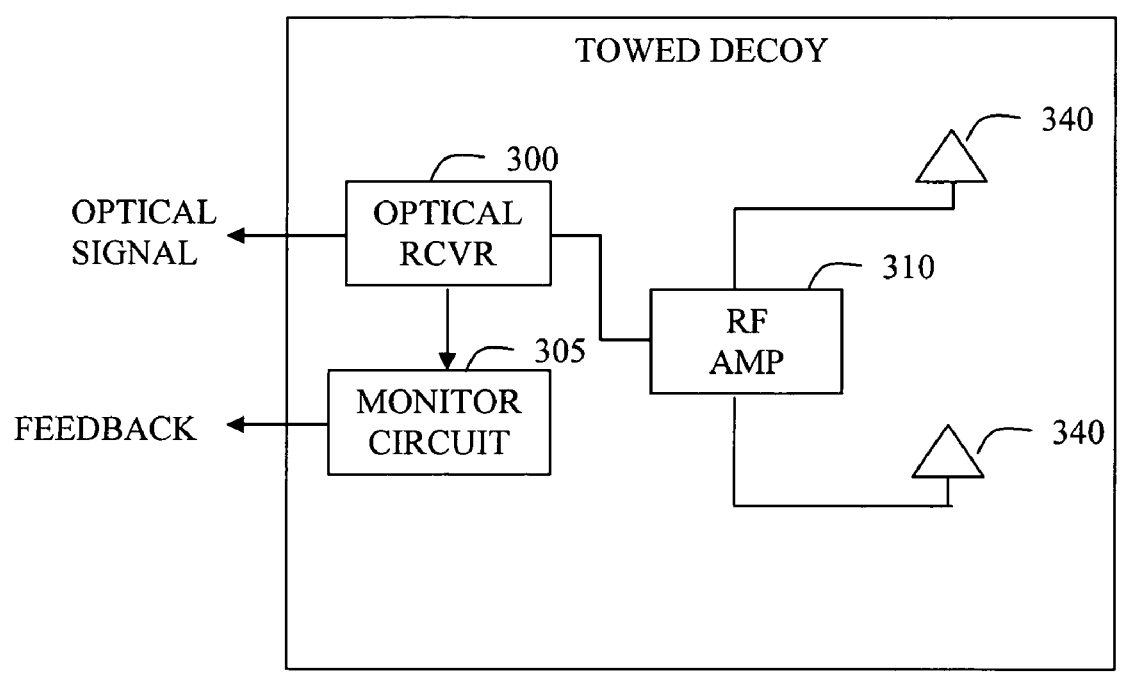
FIG. 3 depicts a towed decoy system according to an embodiment of the present invention.

FIG. 3 depicts a fiber optic towed decoy system that incorporates circuitry capable of generating feedback to a driver/control system according to an embodiment of the present invention. Referring to FIG. 3, the towed decoy includes an optical receiver 300, monitor circuitry 305, a RF amplifier 320 and two antennas 340. This embodiment is illustrative, and any number of antennas may be implemented according to the present invention.

The optical receiver 300 receives the optical signal from a fiber optic line coupled to the blind mate connector. A photodiode within the optical receiver converts the optical signal into a radio frequency (RF) signal. The RF signal then travels to the RF amplifier 320 and is amplified prior to being applied to the antennas 340, which transmit the amplified signals. The signals transmitted from the antennas 340 are powerful and may be used, for example, to disrupt the operation of incoming guided missiles. Because of the feedback loop, the optical signal arriving at the photodiode within the optical receiver has a level that is less dependent on optical attenuation in connectors in the optical path. The result is better performance and a more predictable signal being generated by the towed decoy. In addition, when an EDFA device is used in the driver, the higher optical power of the optical signal brought about by the EDFA device may allow the gain required in the towed decoy to be less and therefore permit the use of less expensive components in the towed decoy.

Figure 4A:
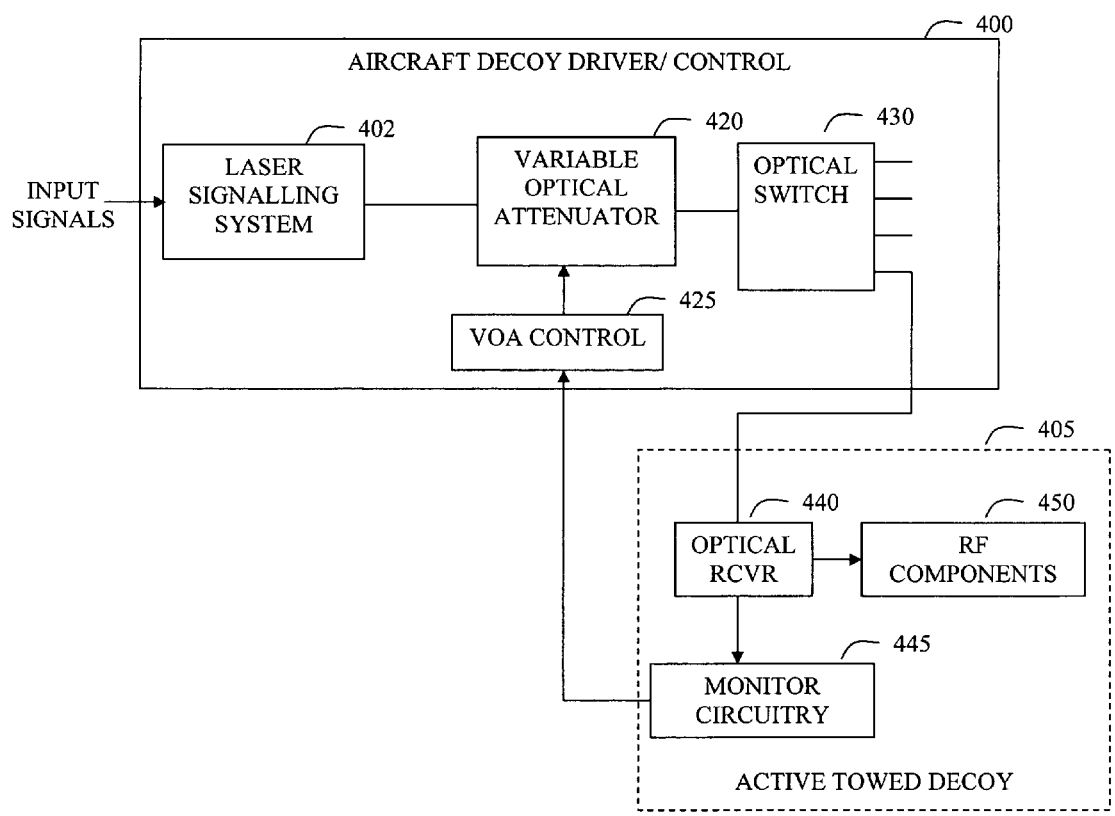
FIG. 4A depicts an aircraft decoy driver/control system and its interaction with an active towed decoy system, according to embodiments of the present invention.

FIG. 4A depicts an aircraft decoy driver/control system 400 and its interaction with an active towed decoy system 405. Referring to FIG. 4, the aircraft decoy control system 400 includes a laser signaling system 402, a variable optical attenuator 420, a VOA Control unit 425 and an optical switch 430. The laser signaling system 402 may incorporate a laser and a MZM or a laser without a MZM as shown and described with reference to FIG. 2. In general, the laser signaling system receives an input signal, which may be an optical signal or a RF signal, and outputs an optical signal to the variable optical attenuator 420.

The variable optical attenuator 420 receives the modulated optical signal from the laser signaling system 402 and reduces the amplitude of the signal prior to transmitting the optical signal to the optical switch 430. The optical attenuator receives a control signal from a VOA control unit 425 that is used to adjust the amount of attenuation by which it reduces the amplitude of the optical signal. The attenuation is adjusted in order to control the overall gain of the link between the laser and the active towed decoy. The generation of the control signal is discussed in more detail below.

The optical switch 430 receives the optical signal from the variable optical attenuator 420 and introduces additional attenuation in the optical path. However, the variable optical switch is used to allow the connection of multiple towed decoys to the aircraft decoy driver. According to one embodiment of the invention, up to four towed decoys may be connected to the optical switch. At any given time, one towed decoy is active and the optical path from the laser signaling system is coupled to the optical path leading to the active towed decoy.

The signal output from the optical switch 430 is optically coupled to the active towed decoy 405. This coupling may occur through one or more connectors, including a blind mate connector. The signal is applied to an optical receiver 440 within the active towed decoy 405.

The optical receiver 440 includes an optical element, such as a photodiode, that produces a current or a voltage that is proportional to the amplitude of the optical signal received from the aircraft decoy control system 400. The photodiode or other device within the optical receiver outputs a signal to monitor circuitry 445 within the active towed decoy. When the amplitude is too high (i.e. there is too much optical gain), the current or voltage applied to the monitor circuitry causes the monitor circuitry to output a control signal to the variable optical attenuator that indicates that the gain is too high. This signal may comprise a digital or an analog value, and may reflect that the current or voltage applied to the monitor circuitry exceeds or is less than one or more thresholds. Alternatively, the monitor circuitry may output a control signal that is proportional to the value of current or voltage on its input. In general, the monitor circuitry outputs a value or a feedback signal to the VOA control unit 425 that reflects the level of the optical signal applied to the optical receiver 440 or the level by which that signal is above or below threshold or target values.

When the monitor circuitry determines that the optical signal level is too high, it conveys a signal to the VOA control unit 425 which causes it to send a signal to the VOA 420 to cause it to introduce additional attenuation into the optical path to reduce the overall link gain and reduce the optical signal level applied to the optical receiver. Conversely, when the monitor circuitry determines that the optical signal level is too low, it conveys a signal to the VOA control unit 425 which causes it to send a signal to the VOA 420 to cause it to reduce the attenuation applied to the optical path to increase the overall link gain and increase the optical signal level applied to the optical receiver. In this manner, a feedback loop is used to keep the optical signal level applied to the optical receiver within the active towed decoy to a relatively constant level. While a photodiode within the optical receiver has been described as the device that generates a signal proportional to the optical signal received, it will be understood that any other device capable of generating a signal proportional to the optical signal level received may be used to generate the control signal.

The optical signal received by the optical receiver is also output as a RF signal and applied to RF components 450 within the active towed decoy system 405. The RF components emit signals corresponding to the optical signals received from the aircraft decoy control system 400. In general, the RF components emit signals at high amplitude and seek to overpower, impair and/or destroy electronics on missles or other systems within close proximity to the active towed decoy system.

In this manner, an aircraft decoy control system 400, having a single optical gain design, may be installed on a variety of different aircraft platforms and still operate at desired levels of gain. This is so, notwithstanding the substantial variation in attenuation levels along the optical path of different aircraft platforms due to optical connectors, blind mate connectors and other factors.

Figure 4B:
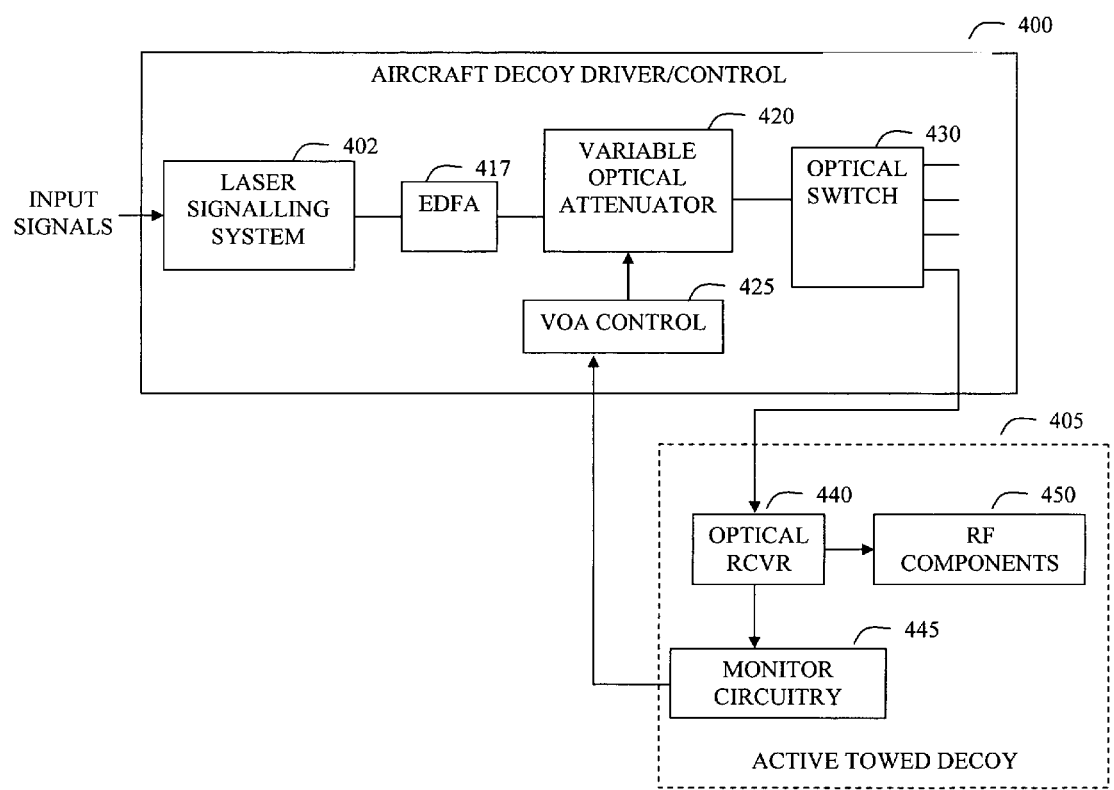
FIG. 4B depicts an aircraft decoy driver/control system that includes an amplifier in the optical path and its interaction with an active towed decoy system, according to embodiments of the present invention.

FIG. 4B depicts another embodiment of the aircraft decoy driver/control system 400 and its interaction with an active towed decoy system 405. Referring to FIG. 4B, the figure is the same as FIG. 4A, except that FIG. 4B includes an optical amplifier in the optical path between the laser signaling system 402 and the variable optical attenuator 420. In particular, an erbium doped fiber amplifier 417 is introduced, and increases the signal level of the optical signal. It produces a relatively constant output power and operates in a saturated mode. The EDFA 417 boosts the optical signal level and thus is able to compensate when a relatively weak laser source is used. This enables one to decrease the implementation cost of the optical transmission system. In addition, the EDFA 417 tends to produce a relatively constant output power and therefore produces a more predictable optical signal level that is attenuated and controlled according to the present invention. When coupled with the variable optical attenuator 420, the aircraft decoy control system 400 and EDFA 417 are able to accommodate a wide range of optical gain and thus can be implemented on a wide range of aircraft platforms having a broad range of attenuation characteristics because the aircraft decoy control system is able to adjust and compensate for variation between systems and still ensure a relatively constant overall link gain within tolerable margins based on the feedback system.

Figure 5:
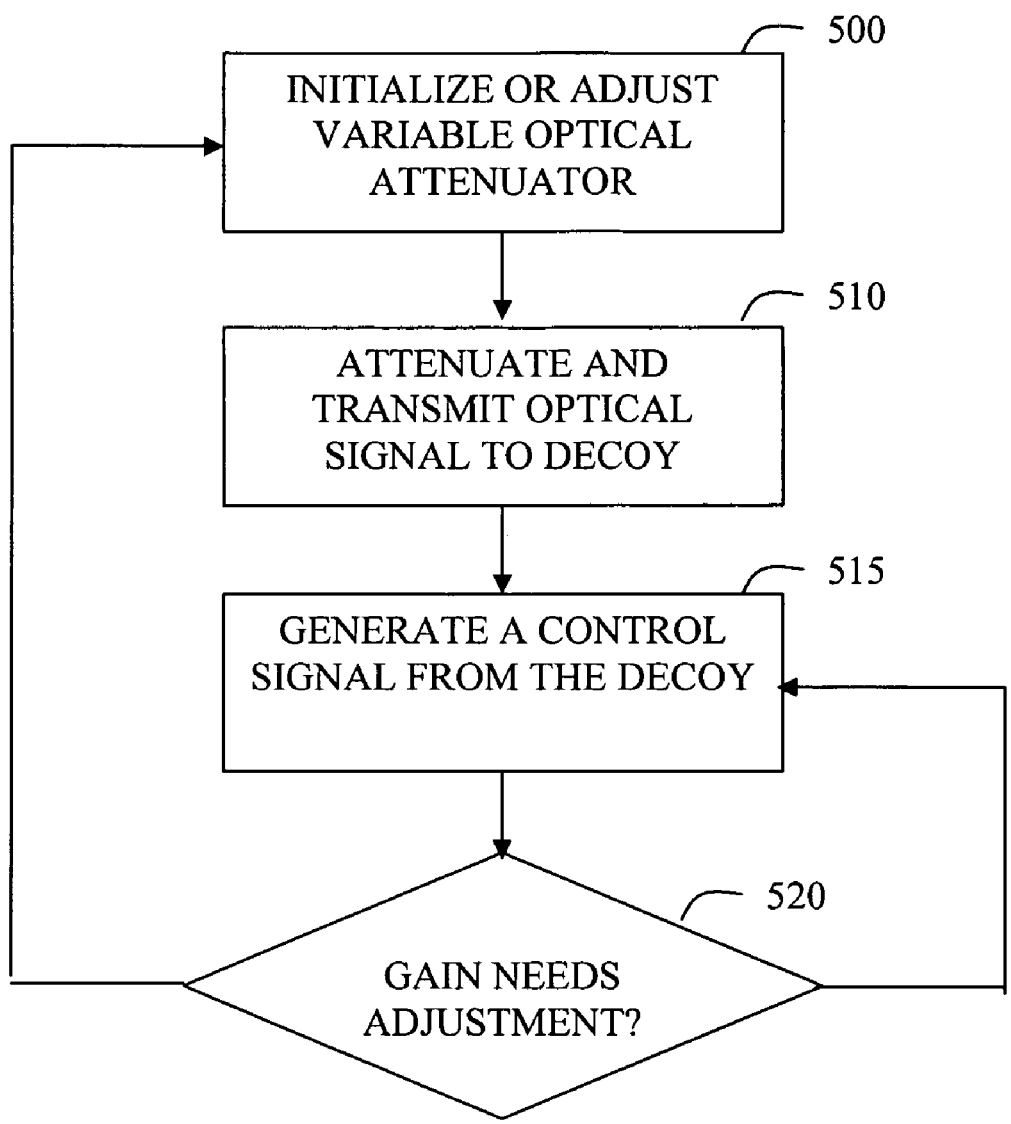
FIG. 5 depicts a method of initializing an active towed decoy system according to an embodiment of the present invention.

FIG. 5 depicts an illustrative method for controlling the gain and attenuation within a towed decoy system. Referring to FIG. 5, in step 500 the variable optical attenuator is initially set a particular attenuation. This may be the maximum attenuation, minimum attenuation or any other convenient value. In step 505, the laser signaling system is activated and produces an optical signal. In step 510, the optical signal is attenuated and transmitted to the decoy. In step 515, the system generates a control signal based on the level of the optical signal received at the decoy. The control signal may be generated based on the output of a photodiode within the receiver and monitor circuitry or in any other convenient manner. In step 520, a determination is made as to whether the gain needs to be adjusted. An adjustment may be required if the amplitude of the optical signal received at the towed decoy is too low or too high. If the amplitude needs to be adjusted, then step 500 begins again and in step 500 the attenuation is either increased or decreased, based on the value of the control signal, in order to compensate for gain that is too high or too low. If the amplitude does not need to be adjusted then step 515 begins again and a control signal is generated based on the level of the optical signal received at the towed decoy. In this manner, the level of the optical signal at the decoy may be measured periodically, at regular intervals or irregular intervals in order to adjust the attenuation as desired to keep the level of optical gain relatively constant.

While particular embodiments of the present invention have been described, it will be understood by those having ordinary skill in the art that changes may be made to those embodiments without departing from the spirit and scope of the present invention.

What is claimed is:

1. A towed decoy communications system, comprising:
a decoy driver system including a variable optical attenuator operable to generate an optical signal for a towed decoy;
an optical receiver that receives the optical signal and generates an RF signal based on the optical signal; and
feedback circuitry within a towed decoy that generates a feedback signal based on a received current that is proportional to the amplitude of the optical signal received at the towed decoy;
wherein the variable optical attenuator attenuates the optical signal based on the feedback signal.

2. The towed decoy communications system according to claim 1, wherein the decoy driver system further comprises a VOA control unit that receives the feedback signal and generates control signals to the VOA based on the feedback signal.

3. The towed decoy communications system according to claim 1, further comprising a laser signaling system that directly modulates an input signal to produce the optical signal conveyed to the attenuator.

4. The towed decoy communications system according to claim 1, wherein the decoy driver system further comprises a laser signaling system that indirectly modulates an input signal to produce the optical signal conveyed to the attenuator.

5. The towed decoy communications system according to claim 1, wherein the decoy driver system further comprises a laser signaling system that generates an optical signal in response to an input signal and an optical amplifier that amplifies the optical signal prior to conveying it to the attenuator.

6. The towed decoy communications system according to claim 1, wherein the optical amplifier is an EDFA.

7. The towed decoy communications system according to claim 1, further comprising an optical switch operable to provide the optical signal to multiple towed decoys.

8. A decoy driver system, comprising:
a laser signaling system for generating an optical signal based on an input signal;
a variable optical attenuator operable to generate an output optical signal for a towed decoy; and
a control unit operable to receive a feedback signal from a towed decoy and adjust the variable optical attenuator to increase or decrease the strength of the output optical signal based on the feedback signal;
wherein the feedback signal is based on a current or a voltage that is proportional to the amplitude of the optical signal received by the towed decoy.

9. The decoy driver system according to claim 8, wherein the laser signaling system is operable to directly modulate an input signal to produce the optical signal conveyed to the attenuator.

10. The decoy driver system according to claim 8, wherein the laser signaling system is operable to indirectly modulate an input signal to produce the optical signal conveyed to the attenuator.

11. The decoy driver system according to claim 8, further comprising an optical amplifier that amplifies the optical signal prior to conveying it to the attenuator.

12. The decoy driver system according to claim 11, wherein the optical amplifier is an EDFA.

13. The decoy driver system according to claim 8, further comprising an optical switch operable to provide the output optical signal to multiple towed decoys.

14. A towed decoy system operable to perform adjustable control, comprising:
an optical receiver operable to receive an optical signal and convert it to an RF signal;
a monitor circuit that generates a feedback signal based on a current that is proportional to the amplitude of the optical signal received;
an amplifier operable to receive the RF signal and amplify it; and
at least one transmit antenna operable to transmit the amplified optical signal;
wherein the feedback signal is used to adjustably control the level of the optical signal applied to the optical receiver.

15. A method of controlling an towed decoy system, comprising:
generating an optical signal;
attenuating the optical signal and outputting the attenuated signal to a towed decoy system;
generating a control signal to control the attenuation based on feedback from the optical decoy, wherein the feedback from the optical decoy is based on a current or voltage that is proportional to the amplitude of the optical signal received by the towed decoy; and
adjusting the attenuation based on the control signal.

* * * * *